US009461845B2

(12) United States Patent
Qiu et al.

(10) Patent No.: US 9,461,845 B2
(45) Date of Patent: Oct. 4, 2016

(54) METHODS AND APPARATUS TO PROVIDE VOICE COMMUNICATION ERROR NOTIFICATIONS

(75) Inventors: Chaoxin Charles Qiu, Austin, TX (US); Jeffrey Lee Scruggs, Round Rock, TX (US); Robert F. Dailey, Austin, TX (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 2271 days.

(21) Appl. No.: 11/561,944

(22) Filed: Nov. 21, 2006

(65) Prior Publication Data

US 2008/0117826 A1    May 22, 2008

(51) Int. Cl.
*H04L 12/66*    (2006.01)
*H04L 29/06*    (2006.01)
*H04M 7/00*    (2006.01)

(52) U.S. Cl.
CPC ........... *H04L 12/66* (2013.01); *H04L 65/1006* (2013.01); *H04M 7/006* (2013.01)

(58) Field of Classification Search
None
See application file for complete search history.

(56) References Cited

U.S. PATENT DOCUMENTS

| 5,490,208 | A | 2/1996 | Remillard |
| 5,844,636 | A | 12/1998 | Joseph et al. |
| 6,061,434 | A | 5/2000 | Corbett |
| 6,493,876 | B1 | 12/2002 | DeFreese et al. |
| 6,779,198 | B1 | 8/2004 | Morinaga et al. |
| 6,831,969 | B2 * | 12/2004 | Ju .............................. 379/142.16 |
| 7,092,700 | B2 * | 8/2006 | Daurensan ..................... 455/417 |
| 7,493,110 | B2 * | 2/2009 | Jiang .............................. 455/418 |
| 7,493,381 | B2 * | 2/2009 | Garg .............................. 709/223 |
| 2001/0052019 | A1 | 12/2001 | Walters et al. |
| 2002/0144273 | A1 | 10/2002 | Reto |
| 2003/0142802 | A1 | 7/2003 | Hong et al. |
| 2003/0204376 | A1 | 10/2003 | Obata et al. |
| 2004/0043776 | A1 * | 3/2004 | Tuomela .............. H04Q 3/0016 455/456.3 |
| 2004/0098749 | A1 | 5/2004 | Sansom |
| 2004/0131357 | A1 | 7/2004 | Farmer et al. |
| 2004/0261115 | A1 * | 12/2004 | Bartfeld ........................ 725/106 |
| 2004/0268404 | A1 | 12/2004 | Gray et al. |
| 2005/0094788 | A1 * | 5/2005 | Lipton et al. ............ 379/142.01 |
| 2005/0097622 | A1 | 5/2005 | Zigmond et al. |
| 2005/0122391 | A1 | 6/2005 | Fukuda et al. |

(Continued)

FOREIGN PATENT DOCUMENTS

JP    07030872    1/1995
JP    205110067    4/2005

OTHER PUBLICATIONS

R. Avasarala, S. Saha, A Session Initiation Protocol (SIP) Missed calls and Messages Event Package for Missed Calls, draft-ranjit-missed-callsmsgs-00, Sep. 17, 2005, pp. 1-17.*

(Continued)

*Primary Examiner* — Christopher Crutchfield
(74) *Attorney, Agent, or Firm* — Hanley, Flight & Zimmerman, LLC

(57) ABSTRACT

Methods and apparatus to provide voice communication inoperative condition notifications are disclosed. An example method includes detecting an inoperative condition associated with a called voice over internet protocol device, comparing the inoperative condition to a criterion, and forwarding an inoperative condition notification for display on a display device associated with the called voice over internet protocol device when the criterion is satisfied.

21 Claims, 9 Drawing Sheets

(56) References Cited

U.S. PATENT DOCUMENTS

2006/0031904 A1* 2/2006 Groff et al. .................. 725/106
2007/0274486 A1* 11/2007 Kister ..................... 379/142.06

OTHER PUBLICATIONS

Author Unknown, Sipient Systems, The SIPFlow FAQ, as archived by the internet Archive on May 11, 2006, pp. 1-3.*
Session Initiation Protocol (SIP) Specific Event Notification, A.B. Roach, dynamicsoft, Jun. 2002, 31 pages.
U.S. Appl. No. 11/287,147, entitled "Caller ID Information to Internet Protocol Television Displays", filed Nov. 22, 2005, 69 pages.
U.S. Appl. No. 11/445,121, entitled "Methods and Apparatus to Provide Media Content Created For a Specific Individual via IPTV", filed Jun. 1, 2006, 25 pages.
U.S. Appl. No. 11/400,906, entitled "System and Method of Providing Call Source Information", 59 pages.

* cited by examiner

| Error Category | Error Condition Detail | Repetition Threshold | Message |
|---|---|---|---|
| User Device Out of Service | Registration Expired | Any | Your device (Phone Number #) is not connected to the network |
| | Network-initiated De-registration | Any | Your device (Phone Number #) is disconnected to the network |
| | SIP requests to UE (for incoming calls) timeout | 2 occurrences in 15 minutes | The network can not connect to your device (Phone Number #) |
| Feature Errors | Incoming Call Forward Unconditional On For More Than One Day | Any | Reminder: your device (Phone Number #) has been set up to forward ALL incoming calls to a third party |
| | Blocking Incoming Calls Unconditional On for More Than One Day | Any | Reminder: your device (Phone Number #) has been set up to block ALL incoming calls |
| Server Office Errors | Call Processor Can't Connect With Other Dependent Network Elements | Any | Network is experiencing temporary trouble to provide services. Please contact customer care (8xx Phone Number) if this condition persists |
| | SIP Requests for Outgoing Calls Timeout | 4 occurrences in 30 minutes | Network has some temporary difficulty to provide services. Please contact customer care (8xx Phone Number) if this condition persists |
| Outgoing Call Processing Receives Error Responses at SIP Requests | 400 Bad request | 10 occurrences in 180 minutes | Network has some temporary difficulty to provide services. Please contact customer care (8xx Phone Number) if this condition persists |
| | 402 Payment Required | | |
| | 403 Forbidden | | |
| | 404 Not Found | | |
| | 405 Method not allowed | | |
| | 406 Not acceptable | | |
| | 407 Proxy authentication required | | |
| | 408 Request timeout | | |
| | 410 Gone | | |
| | 413 Request entity too large | | |
| | 414 Request-URI too long | | |
| | 415 Unsupported media type | | |
| | 416 Unsupported URI scheme | | |

FIG. 2A

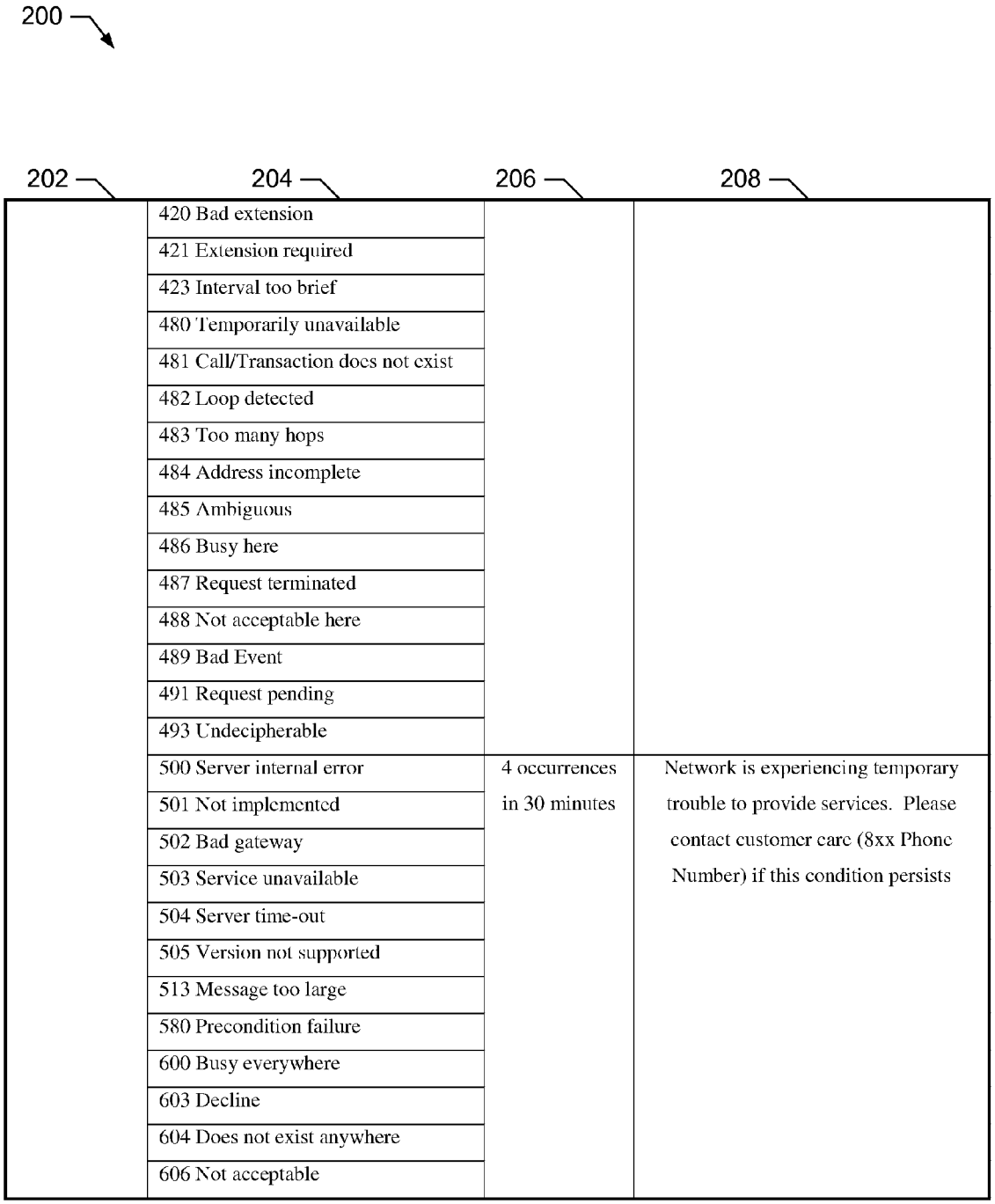

| 202 | 204 | 206 | 208 |
|---|---|---|---|
| | 420 Bad extension | | |
| | 421 Extension required | | |
| | 423 Interval too brief | | |
| | 480 Temporarily unavailable | | |
| | 481 Call/Transaction does not exist | | |
| | 482 Loop detected | | |
| | 483 Too many hops | | |
| | 484 Address incomplete | | |
| | 485 Ambiguous | | |
| | 486 Busy here | | |
| | 487 Request terminated | | |
| | 488 Not acceptable here | | |
| | 489 Bad Event | | |
| | 491 Request pending | | |
| | 493 Undecipherable | | |
| | 500 Server internal error | 4 occurrences in 30 minutes | Network is experiencing temporary trouble to provide services. Please contact customer care (8xx Phone Number) if this condition persists |
| | 501 Not implemented | | |
| | 502 Bad gateway | | |
| | 503 Service unavailable | | |
| | 504 Server time-out | | |
| | 505 Version not supported | | |
| | 513 Message too large | | |
| | 580 Precondition failure | | |
| | 600 Busy everywhere | | |
| | 603 Decline | | |
| | 604 Does not exist anywhere | | |
| | 606 Not acceptable | | |

METHODS AND APPARATUS TO PROVIDE VOICE COMMUNICATION ERROR NOTIFICATIONS

FIELD OF THE DISCLOSURE

This disclosure relates generally to communication systems and, more particularly, to methods and apparatus to provide voice communication error notifications.

BACKGROUND

Currently, voice communication systems (e.g., plain old telephone system (POTS) networks, voice over internet protocol (VoIP) communication networks, etc.) provide notifications to a caller that a call cannot be completed or an inoperative condition is present (e.g., the line is busy, a network error occurred, etc.). However, no immediate call failure notification is provided to a call destination (e.g., a person being called by the caller). Instead, a notification may be placed in a call log associated with the destination and/or the caller may leave a voicemail message in a voicemail mailbox associated with the destination.

Recently, multiple telecommunication services (e.g., VoIP services, internet protocol television (IPTV) services, etc.) have been communicatively linked together. By linking telecommunication services, notifications associated with one service can be transmitted to a consumer via a second service. For example, notifications associated with a VoIP service can be transmitted using an IPTV service. Example methods and apparatus for transmitting VoIP communication system notifications over an IPTV system are described in U.S. patent application Ser. Nos. 11/287,147, 11/445,121, and 11/400,906, which are hereby incorporated by reference.

BRIEF DESCRIPTION OF THE DRAWINGS

FIG. 2A illustrates example criteria for the filter of FIG. 1.

FIG. 2B illustrates a continuation of the example criteria of FIG. 2A for the filter of FIG. 1

DETAILED DESCRIPTION

Figure 1:
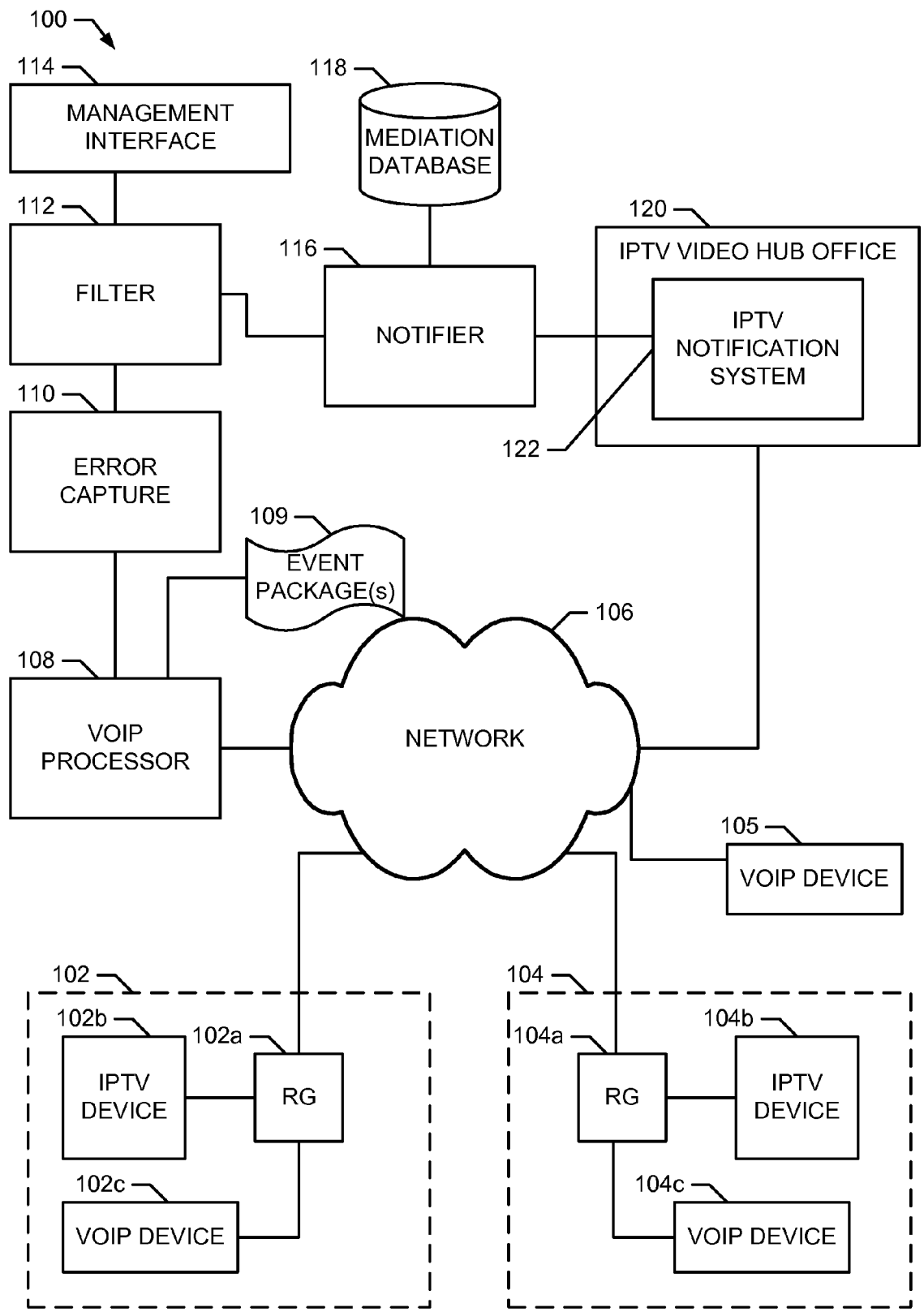
FIG. 1 is a block diagram of an example system for filtering voice communication notifications.

FIG. 1 is a block diagram of an example system 100 for filtering voice communication notifications. In the illustrated example, notifications from a voice over internet protocol (VoIP) communication system are filtered prior to transmission to consumer locations via an internet protocol television system. For example, in the example shown in FIG. 1, a notification associated with a VoIP communication session destined for a consumer that results in an error is transmitted to a consumer television via an IPTV system after it is determined that the notification meets predefined criteria.

The example system 100 of FIG. 1 includes a first consumer location 102, a second consumer location 104, a VoIP device 105, a network 106, a VoIP processor 108, an event package 109, an error capture 110, a filter 112, a management interface 114, a notifier 116, a mediation database 118, an IPTV hub office 120, and an IPTV notification system 122. While the example system 100 includes components of a VoIP communication system, any communication system may be used such as, for example, a plain old telephone system (POTS), an instant messaging communication system, an electronic mail communication system, etc. In addition, while the example system 100 includes components of an IPTV distribution system, any media content distribution system may be used such, for example, a cable television distribution system, a broadcast television distribution system, a satellite television distribution system, a radio distribution system, an internet service, etc.

In the illustrated example, the first consumer location 102 comprises a residential gateway 102a, an IPTV device 102b, and a VoIP device 102c. The first consumer location may be a household, a business, a public place, or any other location where consumers can receive IPTV media content. Further, the first consumer location may include more than one physical location. For example, the IPTV device 102b need not be located near the VoIP device 102c and/or both devices may be connected to different residential gateways (e.g., residential gateway 102a and another residential gateway (not shown)).

The residential gateway 102a of the illustrated example is connected to the network 106. The examples residential gateway 102a sends data to and receives data from other devices connected to the network 106. In the illustrated example, the residential gateway 102a sends internet protocol data to and receives internet protocol data from the second consumer location 104, the VoIP processor 108, and the IPTV video hub office 120. In the illustrated example, the residential gateway 102a receives IPTV media content and messages from the IPTV video hub office 120. In addition, the example residential gateway 102a attempts to initiate VoIP communications with, for example, the second consumer location 104 using the VoIP processor 108 where the VoIP device 102c is used to call the VoIP device 104c at the second location 104 and/or the VoIP device 105.

The residential gateway 102a of the illustrated example is implemented by an asynchronous digital subscriber line (ADSL) transmission unit-remote (ATU-R). However, the residential gateway 102a may alternatively be implemented by a set top box, a cable modem, a dial-up modem, or any other type of communication device. The residential gateway 102a may include IPTV reception capabilities and/or VoIP capabilities. One or both of those functions (IPTV and/or VoIP) may be included in separate devices (e.g., the IPTV device 102b and/or the VoIP device 102c).

The IPTV device 102b of the illustrated example communicates with the IPTV video hub office 120 via the residential gateway 102a and the network 106 to receive IPTV media content and/or messages. The IPTV device 102b of the illustrated example includes a display for presenting the IPTV media content and/or messages to consumers. Alternatively, a separate display device may be connected to the IPTV device 102b.

The IPTV device 102b receives messages from the IPTV notification system 122 of the IPTV video hub office 120. For example, the IPTV device 102b receives and displays messages from the IPTV notification system 122 associated with VoIP communications destined for the VoIP device 102c. For instance, if the VoIP device 102c is powered off when a VoIP communication from the consumer location 104 is destined for the VoIP device 102c, the IPTV notification system 122 displays a message to a consumer via the IPTV device 102b providing an error message/inoperative condition message associated with the VoIP communication.

The VoIP device 102c of the illustrated example is capable of initiating and receiving VoIP communications. To this end, the example VoIP device 102c connects to and authenticates with the VoIP processor 108. The VoIP processor 108 sends VoIP communication messages destined for the consumer associated with the VoIP device 102c to the VoIP device 102c via the network 106 and the residential gateway 102a. Alternatively, the VoIP processor 108 may store information about the VoIP device 102c (e.g., an internet protocol address, a network location, etc.) to enable the VoIP processor 108 to send VoIP communications to the VoIP device 102c without the VoIP device 102c connecting to and/or authenticating with the VoIP processor 108. The example VoIP device 102c is a phone adapter and handset. Alternatively, the VoIP device 102c may be a handset connected to a VoIP capable residential gateway (e.g., residential gateway 102a), a router with VoIP capabilities connected to a handset, a personal computer executing software that provides VoIP capabilities, etc.

The consumer location 104 of the illustrated example includes a residential gateway 104a, an IPTV device 104b, and a VoIP device 104c. In the illustrated example, residential gateway 104a, the IPTV device 104b, and the VoIP device 104c are similar to the example residential gateway 102a, the example IPTV device 102b, and the example VoIP device 102c, respectively.

While the example system 100 of FIG. 1 includes a first consumer location and a second consumer location, any number of consumer locations may be associated with the system 100. In addition, the consumer locations associated with the system 100 may include some or all of a residential gateway (e.g., residential gateway 102a and/or residential gateway 104a), an IPTV device (e.g., IPTV device 102b and IPTV device 104b), a VoIP device (e.g., VoIP device 102c and/or VoIP device 104c), and/or any other device(s).

The first consumer location 102 and the second consumer location 104 of the illustrated example are connected to the network 106. In the illustrated example, the first consumer location 102 and the second consumer location are connected to the network 104 via a respective residential gateway (e.g., residential gateway 102a and residential gateway 104a). Alternatively, a consumer location may be connected to the network 106 via multiple connections (e.g., a first connection to a residential gateway and a second connection to an IPTV device).

The VoIP device 105 of the illustrated example is connected directly to the network 106. The example VoIP device 105 allows VoIP communication without a residential gateway. While a single VoIP device 105 connected directly to the network 106 is illustrated, multiple VoIP devices may be connected directly to the network. The VoIP device 105 may include a handset to allow communication or, alternatively, the VoIP device 105 may provide a connection for one or more telephones (e.g., the VoIP device 105 may act as a telephone switch).

The network 106 of the illustrated example is a broadband communications network. The network 106 may be implemented by one or more of any type of local area network, wide area network, public network, private network, public switched telephone network, and/or any other type of communication link.

The VoIP processor 108 of the illustrated example processes VoIP communications for the first consumer location 102 and/or the second consumer location 104. The example VoIP processor 108 of FIG. 1 includes VoIP servers that implement SIP Registrar and SIP Proxy Server functions, (e.g., VoIP soft switches) and 3GPP IMS-based server forms that implement part or all of proxy call session control function (P-CSCF), interrogating CSCF (I-CSCF), serving CSCF (S-CSCF), home subscriber server (HSS), and SIP feature server. The components of the example VoIP processor 108 are described in further detail in U.S. patent application Ser. Nos. 11/287,147, 11/445,121, and 11/400,906 and, thus, in the interest of brevity are not described in further detail herein. Alternatively or additionally, the VoIP processor 108 may include any other component(s).

The example VoIP processor 108 allows other devices to subscribe to messages output by the VoIP processor 108. In the illustrated example, the VoIP processor 108 accepts SIP SUBSCRIBE messages for one or more supported event packages sent from other network elements or VoIP devices. When a subscribed event occurs, the VoIP processor 108 sends a SIP NOTIFY message to subscribed network elements and/or VoIP devices.

The VoIP processor 108 of the illustrated example is capable of supporting one or more event packages 109. The event package 109 of the illustrated example is based on Request for Comments (RFC) 3265 and defines a set of errors, inoperative conditions, or other observable events that should trigger SIP NOTIFY at the VoIP processor 108. For example, the VoIP processor 108 may not normally trigger a SIP NOTIFY when an incoming VoIP communication session is destined for a VoIP device that is registered but is not responding to a call setup signal. In the illustrated example, the example event package 109 establishes a trigger requesting that, when a call is offered to a registered VoIP device that is not responding, a SIP NOTIFY message is transmitted to all network elements and VoIP devices that have subscribed to notification of such events at the VoIP processor 108. Alternatively, if the VoIP processor 108 already supports all desired error notifications (e.g., registered VoIP devices that don't respond to call setup signals), the event packages 109 are not needed to establish new error triggers and may be excluded from the example system 100. The example VoIP processor 108 of FIG. 1 includes an access control list (ACL) that controls which device(s) may subscribe to notifications from the VoIP processor 108. Alternatively, the VoIP processor 108 may allow any device to subscribe to receive notifications.

Example errors/inoperative conditions that may trigger the example VoIP processor 108 to trigger a SIP NOTIFY include (in no particular order): a) the call destination has set up unconditional call forwarding for long time period, b) the call destination fails to register to with the VoIP processor 108 in repeated attempts, c) the call destination cannot be reached due to a network problem, d) the VoIP communication session was interrupted by a network problem, e) the destination of the VoIP communication session does not support a communication protocol required by the VoIP communication session, etc.

The error capture 110 of the illustrated example subscribes to desired event packages supported at the VoIP processor 108 and sends the received event notification to the filter 112. The example error capture 110 subscribes to event packages by sending SIP SUBSCRIBE messages to the VoIP processor 108. The example error capture 110 receives SIP NOTIFY messages from the example VoIP processor 108. In the illustrated example, the example subscription and notification messages are based on RFC 3265. However, any method of subscribing to and transmitting errors/messages may be used.

The error capture 110 may subscribe to a specific event package. For example, the error capture 110 may subscribe to events that are listed in the example event package 109. Alternatively, the error capture 110 may subscribe to receive events from multiple event packages or may subscribe to receive all possible events.

The filter 112 of the illustrated example receives errors, inoperative conditions, and/or messages from the error capture 110 and sends messages that meet predefined criteria to the notifier 116. The example filter 112 receives the predefined criteria from the management interface 114. The predefined criteria indicate the desired errors, inoperative conditions, and/or messages for display on the IPTV display device at consumer locations (e.g., the IPTV display device 102b at the first consumer location 102). The predefined criteria may describe any set or subset of the possible errors, inoperative conditions, and/or messages. For example, the predefined criteria may specify a set of message types, a threshold event level that is desired, a desired maximum repetition rate or threshold, and/or any other criteria. In addition, the predefined criteria may include or be associated (e.g., reference) additional information that is to be included with the errors, inoperative conditions, and/or messages. For example, the predefined criteria may be associated with instructions for getting help or fixing the problem generating the error. The filter 112 combines the errors, inoperative conditions, and/or messages with the additional information specified by the predefined criteria and forward the same to the notifier 116.

The management interface 114 of the illustrated example provides an interface for managing the filter 112. The management interface 114 may additionally or alternatively provide an interface for management of other components of the system 100. The management interface 114 may provide a graphical user interface and/or any other type of user interface. Users of the example management interface 114 can provide information to create or otherwise establish the predefined criteria for filtering errors/messages. In addition, the management interface 114 may allow a user to turn the filters on or off.

The notifier 116 of the illustrated example receives notification messages from the filter 112 that meet the predefined criteria of the example filter 112. The notifier 116 uses the example mediation database 118 to identify an IPTV account associated with the VoIP devices that are concerned with the events. For example, if the VoIP device 102c of the first consumer location 102 initiates a VoIP communication session destined for the VoIP device 104c of the second consumer location 104 and the session cannot be completed (e.g., the VoIP device 104c of the second consumer location 104 is not registered but is not responding to the call setup signal from the call processor 108), the notifier 116 will receive the associated event notification from the filter 112 (e.g., when the error meets the predefined criteria). The notifier 116 extracts an identifier (e.g., a username, a telephone number, an internet protocol address, etc.) associated with the destination (i.e., the VoIP device 104c of the second consumer location 104) from the error. The example notifier 116 queries the mediation database with the identifier and receives an identifier for an IPTV consumer associated with the identifier, if one exists. The notifier 116 of the illustrated example sends the identifier for the IPTV consumer and the error/message to the IPTV notification system 122 of the IPTV video hub office 120.

The mediation database 118 of the illustrated example stores information correlating VoIP subscriber accounts with IPTV subscriber accounts. The mediation database 118 receives queries containing information about a VoIP subscriber and responds with information about associated IPTV subscribers. The example mediation database 118 is implemented by a database that stores records linking VoIP phone numbers with IPTV account numbers. For example, a customer of a telecommunications provider may subscribe to both VoIP services and IPTV services. The mediation database 118 links the customer's VoIP phone number with the customer's IPTV account number. Alternatively, the mediation database 118 may use any other information to link the VoIP account (e.g., an internet protocol address, a VoIP user name/identifier, a network location, etc.) to the IPTV account number (e.g., an internet protocol address, an IPTV user name/identifier, a network location, etc.). In addition, the mediation database 118 may link VoIP accounts with any available IPTV accounts. In other words, a VoIP account for a first consumer may be linked with the IPTV account of a second consumer, if so desired.

The IPTV video hub office 120 of the illustrated example receives media content from media content producers (e.g., television networks, movie studios, etc.) and transmits the media content to consumers (e.g., the first consumer location 102 and/or the second consumer location 104) via the example network 106. The example IPTV video hub office 120 includes an IPTV notification system 122. The IPTV notification system 122 sends notification messages, alerts, etc. to IPTV consumers for display on IPTV devices (e.g., the IPTV device 102b and/or the IPTV device 104b). In the illustrated example, the IPTV notification system 122 receives errors/messages including IPTV account information from the notifier 116 and transmits the notification messages to the IPTV devices specified by the IPTV account information.

Example implementations of the IPTV video hub office 120 and the IPTV notification system 122 are described in the U.S. patent application Ser. Nos. 11/287,147, 11/445, 121, and 11/400,906.

FIGS. 2A and 2B illustrate an example predefined criteria data structure 200 for the filter 112 of FIG. 1. The example predefined criteria data structure 200 includes an error category column 202, an error condition detail column 204, a repetition threshold column 206, and a message column 208.

The error category column 202 stores high level categories associated with the individual error messages stored in the error condition detail column 204. For example, the "User Device Out of Service" category includes the errors "Registration Expired," Network-initiated De-registration," and "SIP requests to UE (for incoming calls) timeout." Grouping error messages into high level categories allows display parameters to be assigned to all error messages in a category. For example, all errors in the "Outgoing Call Processing Receives Error Responses at SIP" category are assigned a repetition threshold of 10 occurrences in 180 minutes by a single assignment (see the repetition threshold column 206).

The error condition detail column 204 stores the individual errors that generate notifications. In the example predefined criteria data structure 200, each error condition stored in the error condition detail column 204 produces a notification and, conversely, error conditions that are not stored in the error condition detail column 204 do not produce a notification. Alternatively, an additional column may be provided in the predefined criteria data structure 200 to indicate which error conditions should generate a notification. In this alternative implementation, the error condition detail column 204 may store error conditions that are not desired for notification and the additional column may indicate that no notification should be generated.

The repetition threshold column 206 stores a parameter indicating a minimum repetition threshold that is to occur before a notification is generated. For example, the repetition threshold column 206 for the "SIP requests to the UE timeout" indicates that the error condition is to occur 2 times within 15 minutes before a notification is sent. The repetition threshold column 206 for the "Registration Expired" error condition indicates that the error condition should generate a notification immediately (e.g., no repetition is required). The predefined criteria data structure may additionally include a column that indicates a maximum repetition level for a notification. In other words, the additional column may indicate that frequency with which a message should be displayed (e.g., no more than once every fifteen minutes).

The example message column 208 stores information about messages that are to be included with the corresponding error condition before being sent to the IPTV notification system 122. For example, the message column 208 indicates that the message "Your device (Phone Number #) is not connected from the network" should be displayed when a "Registration Expired" error condition occurs. The message column 208 may store instructions for troubleshooting the cause of the error/message. In addition, the message may include user selectable links (e.g., universal resource locators (URLs), hyperlinks, etc.) that may be selected to obtain further information or to cause actions automatically to be performed by the components of the example system 100 of FIG. 1. For example, a hyperlink may be included that, when selected, causes the VoIP device 102c of the first consumer location 102 to submit authentication information to the VoIP processor 108 (e.g., the VoIP device 102c may include an accessible application program interface (API) that may be called by the IPTV device 102b to request performance of actions by the VoIP device 102c).

FIGS. 3-7 are flowcharts representative of example machine readable instructions that may be executed to implement the example VoIP processor 108, the example error capture 110, the example filter 112, the example notifier 112, and the example IPTV notification system 122 of the example system 100 of FIG. 1. The example machine readable instructions of FIGS. 3-7 may be executed by a processor, a controller, and/or any other suitable processing device. For example, the example machine readable instructions of FIGS. 3-7 may be embodied in coded instructions stored on a tangible medium such as a flash memory, or random access memory (RAM) associated with a processor (e.g., the processor 812 shown in the example processor platform 800 and discussed below in conjunction with FIG. 8). Alternatively, some or all of the example flowcharts of FIGS. 3-7 may be implemented using an application specific integrated circuit (ASIC), a programmable logic device (PLD), a field programmable logic device (FPLD), discrete logic, hardware, firmware, etc. Also, some or all of the example flowcharts of FIGS. 3-7 may be implemented manually or as combinations of any of the foregoing techniques, for example, a combination of firmware, software, and/or hardware. Further, although the example machine readable instructions of FIGS. 3-7 are described with reference to the flowcharts of FIGS. 3-7, persons of ordinary skill in the art will readily appreciate that many other methods of implementing the example VoIP processor 108, the example error capture 110, the example filter 112, the example notifier 112, and the example IPTV notification system 122 of FIG. 1 may be employed. For example, the order of execution of the blocks may be changed, and/or some of the blocks described may be changed, eliminated, sub-divided, and/or combined. Additionally, persons of ordinary skill in the art will appreciate that the example machine readable instructions of FIGS. 3-7 be carried out sequentially and/or carried out in parallel by, for example, separate processing threads, processors, devices, circuits, etc.

Figure 3:
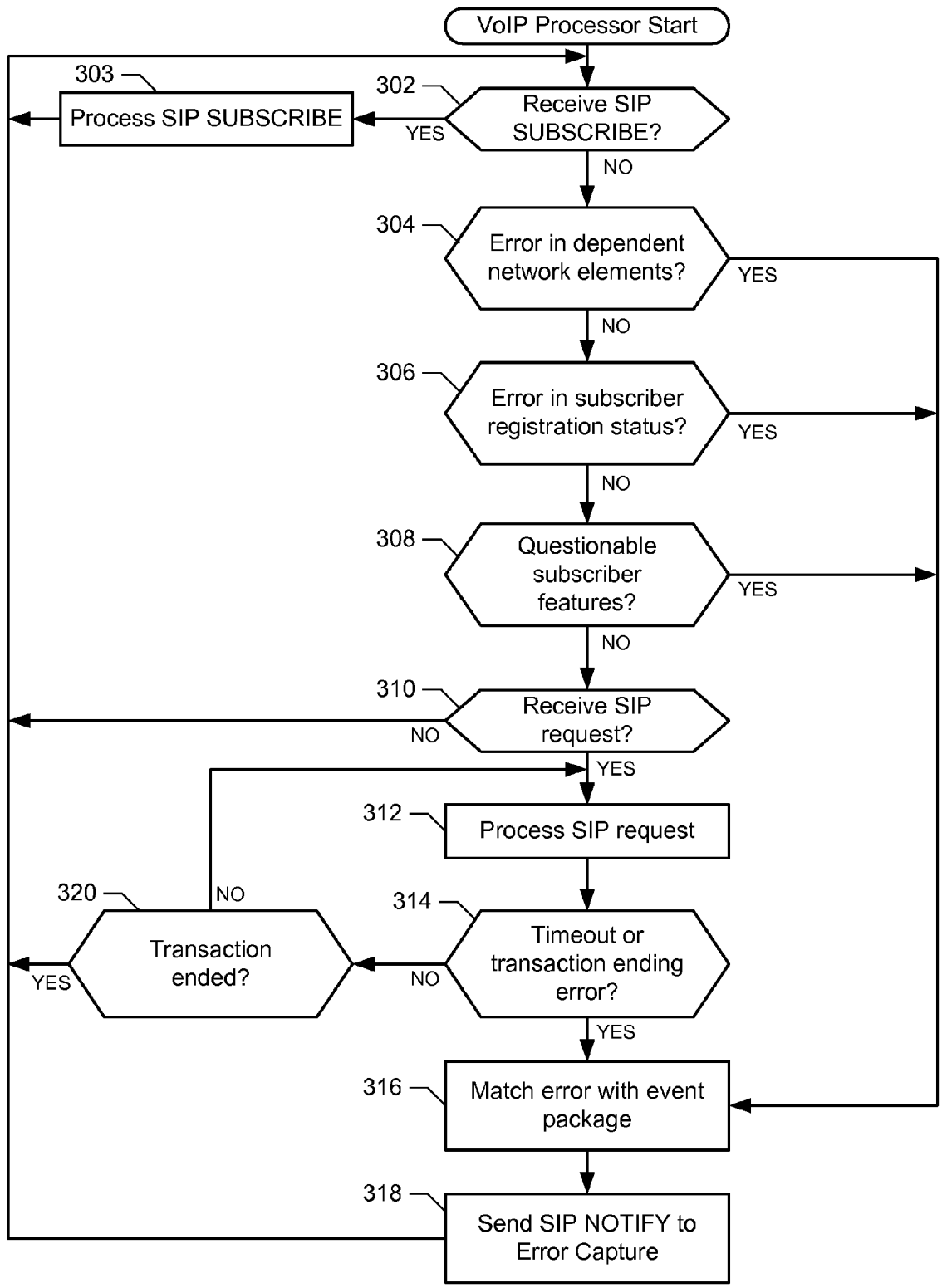
FIG. 3 is a flowchart representative of example machine readable instructions that may be executed to implement the example voice over internet protocol (VoIP) processor of FIG. 1.

FIG. 3 is a flowchart representative of example machine readable instructions that may be executed to implement the example VoIP processor 108 of FIG. 1. The example machine readable instructions of FIG. 3 begin when the VoIP processor 108 checks to see if there is a new SIP SUBSCRIBE message from the example error capture 110 of FIG. 1 (block 302). The SIP SUBSCRIBE message instructs the VoIP processor 108 to include the error capture 110 in the distribution list for SIP NOTIFY messages sent by the VoIP processor 108 when an event in the subscribed event package occurs. The SIP SUBSCRIBE message specifies which of the available event packages of the VoIP processor 108 to which the error capture 110 is subscribed. If a SIP SUBSCRIBE message is pending, the example VoIP processor 108 processes the SIP SUBSCRIBE message to set triggers for the event package(s) specified by the SIP SUBSCRIBE. Control then proceeds to block 302.

If no SIP SUBSCRIBE message is pending, the VoIP processor 108 of the illustrated example then checks dependent network elements to determine if any errors are present (block 304). For example, the VoIP processor 108 may check one or more routers, one or more switches, one or more hubs, one or more authentication servers, etc. If the VoIP processor 108 determines that an error exists in one of the dependent network elements, control proceeds to block 316 to handle the error. Alternatively, the VoIP processor 108 may handle the error only if the error is such that it prevents the VoIP processor 108 from handling VoIP communication sessions.

If the VoIP processor 108 determines that no errors exist in dependent network elements (block 304), the example VoIP processor 108 determines if there are any errors in the registration status of VoIP subscribers (block 306). For example, the VoIP processor 108 may determine that a VoIP subscriber is no longer registered with the VoIP processor 108, a VoIP subscriber's device is not responding, etc. If the VoIP processor 108 determines that an error exists in the registration status of VoIP subscribers, control proceeds to block 316 to handle the error.

If the VoIP processor 108 determines that no errors exist in the registration of VoIP subscribers (block 306), the example VoIP processor 108 determines if any subscribers have selected questionable features (block 308). For example, if a subscriber has set an unconditional call forward for a long time period the VoIP processor 108 can treat this as an error so that a notification will be displayed on consumer televisions. If the VoIP processor 108 determines that questionable features are selected, control proceeds to block 316 to treat the selection as an error and transmit a notification.

If the VoIP processor 108 determines that no questionable features are selected (block 308), the example VoIP processor 108 determines if a SIP request (e.g., a SIP request to initiate an incoming communication session, a SIP request to initiate an outgoing communication session, etc.) (block 310). If a SIP request has not been received, control returns to block 302 to continue monitoring for errors and SIP messages. Alternatively, the example VoIP processor 108 may stop monitoring for errors and wait for a SIP request. In another alternative, the VoIP processor 108 may periodically (e.g., every five minutes, every fifteen times through the loop, etc.) check for errors while continuously waiting for a SIP request.

If the example VoIP processor 108 receives a SIP request (block 310), the VoIP processor 108 processes the SIP request transaction (block 312). For example, if the SIP request is a request to initiate an incoming VoIP communication session, the example VoIP processor 108 attempts to connect the incoming VoIP communication session to the destination of the VoIP communication session. The VoIP processor 108 then determines if the SIP transaction for the request has ended with error or has timed out (block 314). If the SIP transaction has timed out or has ended with error, the VoIP processor 108 proceeds to block 316 to handle the error. Otherwise, the VoIP processor 108 determines whether or not the transaction has ended successfully (block 302). If the transaction has not ended successfully, the VoIP processor 108 continues to process the transaction in block 312. If the transaction has ended successfully, control returns to block 302 to continue monitoring for errors and processing new SIP messages.

If the SIP transaction for the request has timed out, the transaction ends with error, an error is present in a dependent network element, a subscriber registration error has occurred, or a subscriber has questionable features selected, the VoIP processor 108 matches the error with the errors in the subscribed event packages (e.g., the 109 of FIG. 1) (block 316). The example VoIP processor 108 then sends a SIP NOTIFY message including information associated with the error to the network elements or other devices that subscribed to the event (e.g., the error capture 110) (block 318). Control then returns to block 302. Alternatively, in block 316, the VoIP processor 108 may determine that the error does not match an event in the event package and, thus, may ignore the error and return to block 302.

Figure 4:
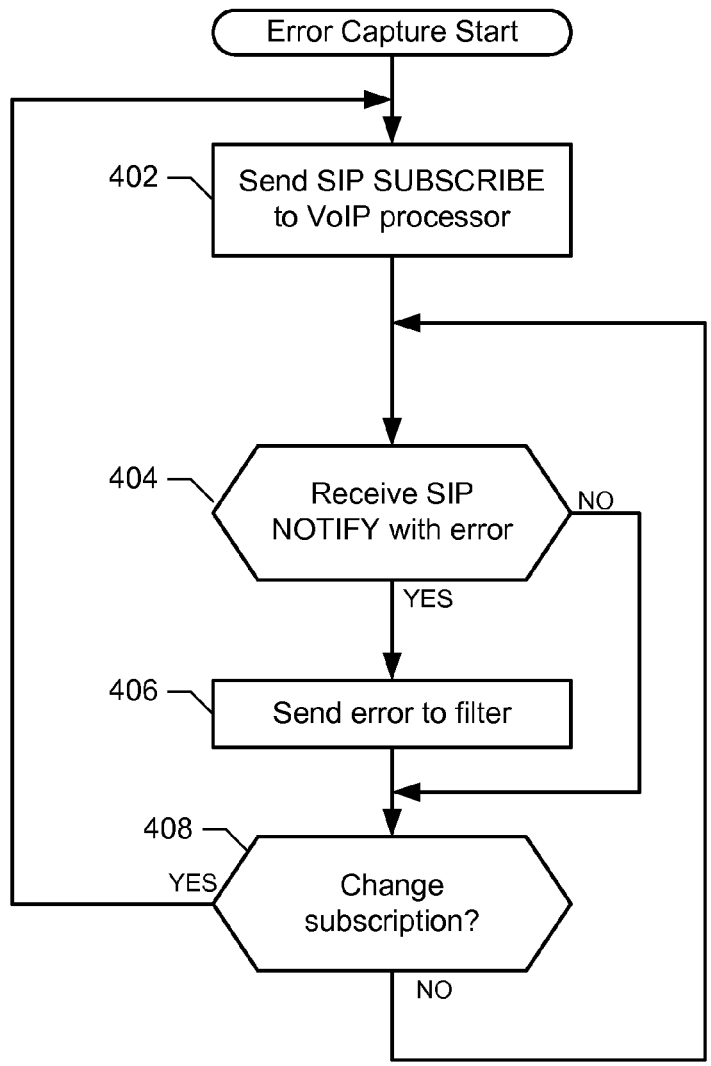
FIG. 4 is a flowchart representative of example machine readable instructions that may be executed to implement the example error capture of FIG. 1.

FIG. 4 is a flowchart representative of example machine readable instructions that may be executed to implement the example error capture 110 of FIG. 1. The example machine readable instructions of FIG. 4 begin when the example error capture 110 sends a SIP SUBSCRIBE message to the VoIP processor 108 to subscribe to receive error messages corresponding to a set of errors (block 402).

The error capture 110 then determines if it has received a SIP NOTIFY message (e.g., the SIP NOTIFY message sent by the VoIP processor 108 in block 314 of FIG. 3) (block 404). If the error capture 110 receives a SIP NOTIFY message (block 404), the error capture 110 sends the error of the SIP NOTIFY message to the example filter 112 of FIG. 1 (block 406). If no SIP NOTIFY is received or after the received notification has been sent to the filter 112, the filter 112 determines if the subscription to SIP NOTIFY messages from the VoIP processor 108 should be changed (e.g., the filter 112 may determine that the subscription should be changed if an unparsable SIP NOTIFY message is received) (block 408). If the subscription should be changed, control proceeds to block 402 to send an updated SIP SUBSCRIBE message. If the filter 112 determines that the subscription does not need to be changed, control returns to block 404 to wait for further SIP NOTIFY messages.

Figure 5:
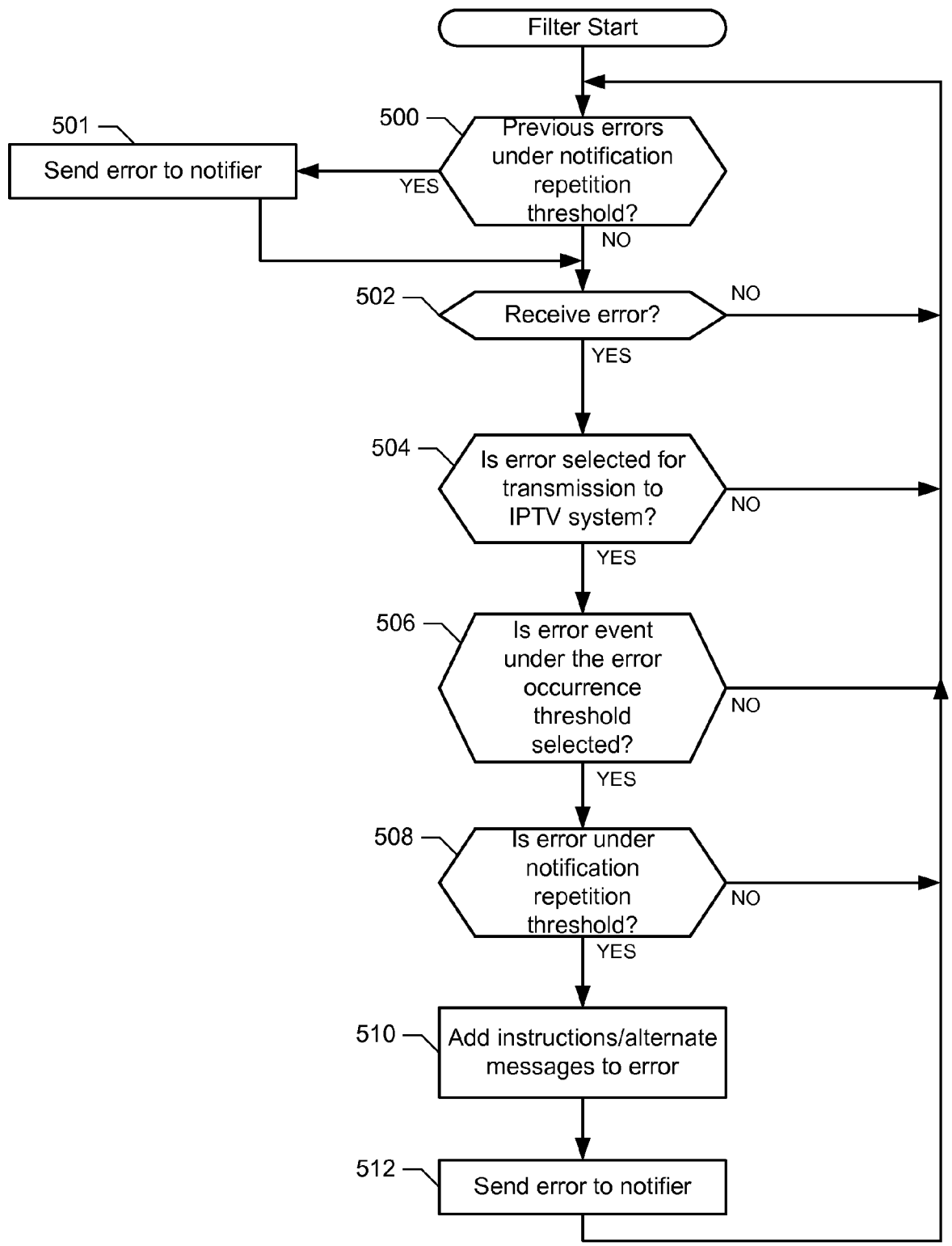
FIG. 5 is a flowchart representative of example machine readable instructions that may be executed to implement the example filter of FIG. 1.

FIG. 5 is a flowchart representative of example machine readable instructions that may be executed to implement the example filter 112 of FIG. 1. The example machine readable instructions of FIG. 5 begin by determining whether or not there is a previous error event that is under an error repetition rate threshold (e.g., a previous error or inoperative condition that should still be sent as a notification) (block 500). If a previous error is under notification repetition threshold, the filter 112 sends the error to the notifier 116 of FIG. 1 (block 501) and control proceeds to block 502. In addition, the example filter 112 may add instructions or alternate messages to the error.

If the filter 112 determines that there are no pending errors or after any pending errors are transmitted to the notifier 116, the filter 112 then checks whether it has received an error message (e.g., the error sent by the example error capture 110 in block 406 of FIG. 4) (block 502). The example filter 112 then determines if the predefined criteria received from the management interface 116 indicates that the error should be displayed (e.g., transmitted to the IPTV notification system 122) (block 504). For example, the filter 112 locates a record in the predefined criteria data structure 200 of FIG. 2 corresponding to the received error. The filter 112 then determines if the display column 202 for the record indicates that the error should be displayed. If the example filter 112 determines that the error should not be displayed, control returns to block 500 to check for any pending notification to be sent.

If the example filter 112 determines that the error should be displayed (block 504), the example filter 112 determines if the error exceeds the error occurrence threshold desired before display (block 506). For example, the example filter 112 may compare an error level to an error level threshold specified in the threshold column 204 of the predefined criteria data structure 200 of FIG. 2. If the example filter 112 determines that the threshold criteria are not met, control returns to block 500 to wait for the next error and/or handle previous errors while the event occurrence counter and time are updated.

If the example filter 112 determines that the threshold criteria are met, the example filter 112 determines if the error is within the notification repetition rate threshold desired for display (block 508). For example, the example filter 112 may compare repetition history for the error type and/or call destination to one or more values in the repetition level column 206 of the predefined criteria data structure 200 of FIG. 2. If the example filter 112 determines that the repetition criteria are not met, control returns to block 500 to wait for the next error and/or handle previous errors.

If the example filter 112 determines that the repetition criteria are met (block 508), the filter 112 adds any desired additional message information to the message (block 510). For example, the example filter 112 may add the message stored in the message column 208 of the predefined criteria data structure 200 of FIG. 2 to the error. The example filter 112 then sends the error with any added messages to the notifier 116 of FIG. 1. Control then returns to block 500.

Figure 6:
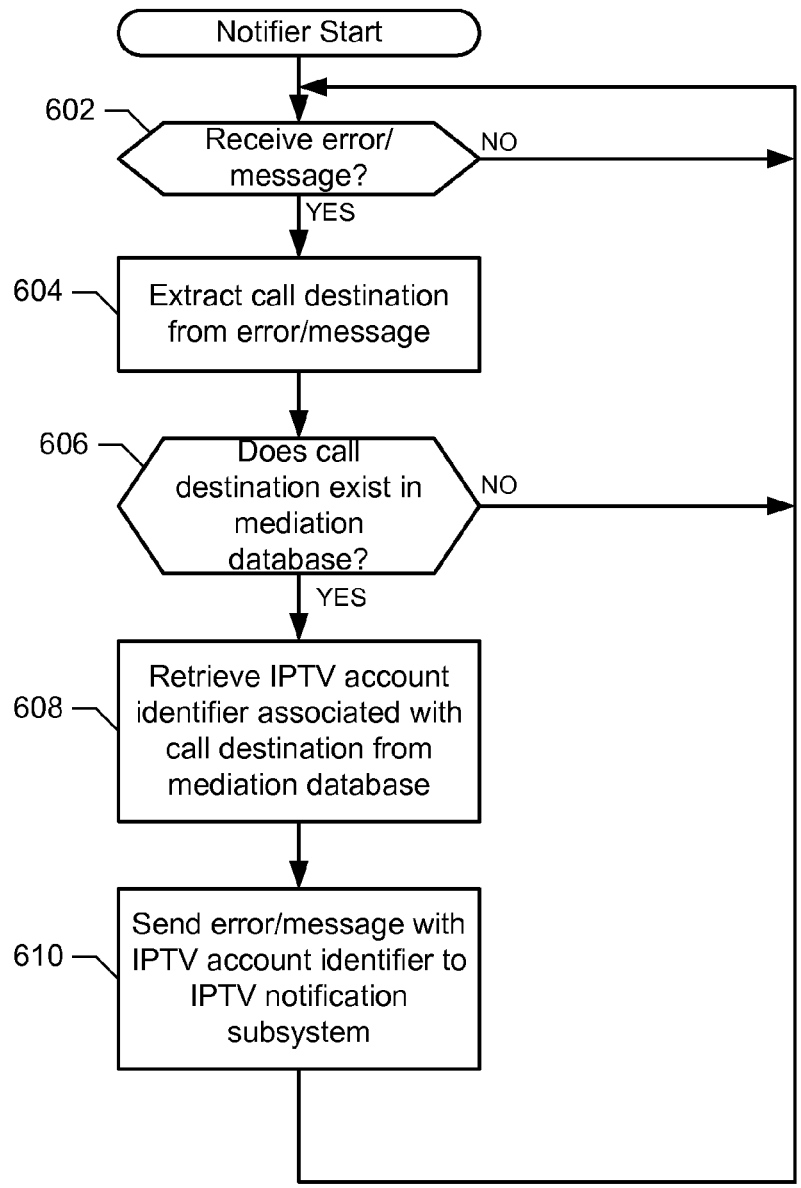
FIG. 6 is a flowchart representative of example machine readable instructions that may be executed to implement the example notifier of FIG. 1.

FIG. 6 is a flowchart representative of example machine readable instructions that may be executed to implement the example notifier 116 of FIG. 1. The example machine readable instructions of FIG. 6 begin when the notifier 116 receives an error and/or message (e.g., the error sent by the example filter 112 in block 512 of FIG. 5) (block 602). The example notifier 116 then extracts an identifier associated with the call destination from the error and/or message (block 604). For example, the identifier may be a VoIP phone number or any other type of identifier to identify the relevant VoIP devices. The example notifier 116 then determines if a record associated with the identifier exists in the mediation database 118 (block 606). If the notifier 116 determines that no records associated with the identifier exist in the mediation database, control returns to block 602 to wait for the next error and/or message.

If the notifier 116 determines that a record associated with the identifier exists in the mediation database (block 606), the example notifier 116 retrieves IPTV account information associated with the identifier from the mediation database (block 608). For example, the notifier 116 may query the database with the identifier and receive the result of the query. The notifier 116 then combines the IPTV account information with the error and/or messages and sends the error and/or message to the IPTV notification system 122 (block 610). Control then returns to block 602 to wait for the next error and/or message.

Figure 7:
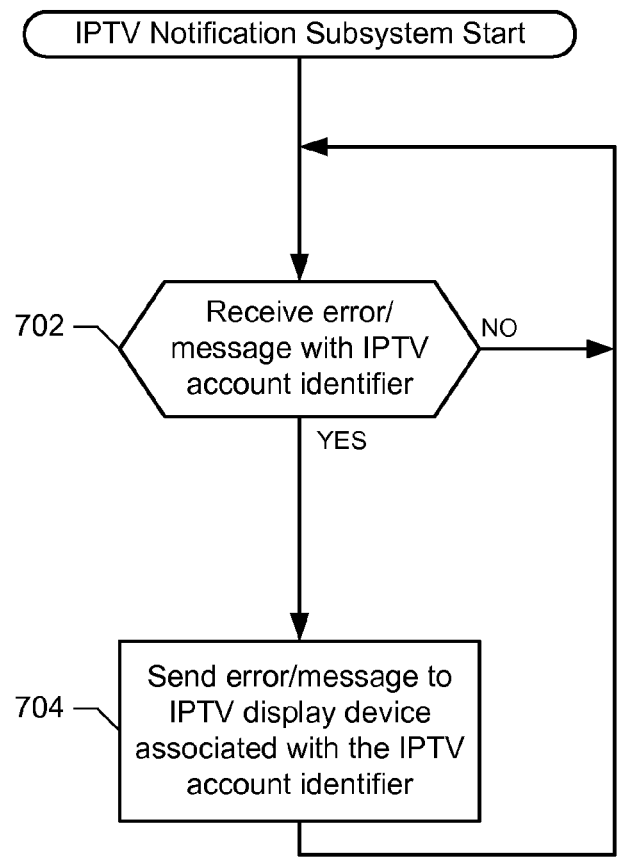
FIG. 7 is a flowchart representative of example machine readable instructions that may be executed to implement the example IPTV notification system of FIG. 1.

FIG. 7 is a flowchart representative of example machine readable instructions that may be executed to implement the example IPTV notification system 122 of FIG. 1. The example machine readable instructions of FIG. 7 begin when the IPTV notification system 122 receives an error and/or message with IPTV account information (e.g., the error and/or message sent by the notifier 116 in block 610 of FIG. 6) (block 702). The IPTV notification system 122 then sends the error and/or message to the IPTV consumer associated with the IPTV account information (block 704). For example, the IPTV notification system 122 may send the message for display on the IPTV device 102c of the first consumer location 102. Any methods and apparatus for sending notifications to a television (e.g., an IPTV) may be used such as, for example, methods and apparatus made by Microsoft® for sending notifications to IPTV.

Figure 8:
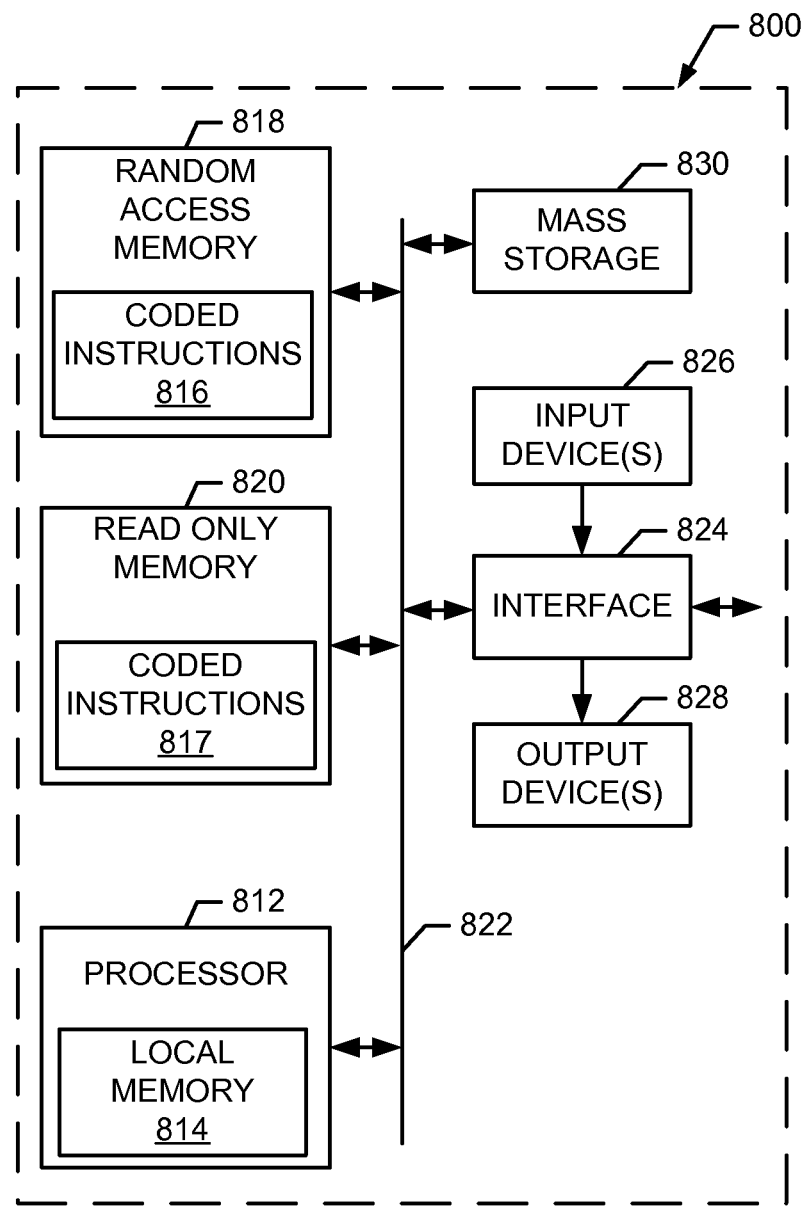
FIG. 8 is a block diagram of an example computer that may execute the machine readable instructions of FIGS. 3, 4, 5, 6, and 7 to implement the example system of FIG. 1.

FIG. 8 is a block diagram of an example computer 800 capable of executing the machine readable instructions illustrated in FIGS. 3, 4, 5, 6, and 7 to implement the apparatus and methods disclosed herein.

The system 800 of the instant example includes a processor 812 such as a general purpose programmable processor. The processor 812 includes a local memory 814, and executes coded instructions 816 present in random access memory 818, coded instruction 817 present in the read only memory 820, and/or instructions present in another memory device. The processor 812 may execute, among other things, the machine readable instructions represented in FIGS. 3, 4, 5, 6, and/or 7. The processor 812 may be any type of processing unit, such as a microprocessor from the Intel® Centrino® family of microprocessors, the Intel® Pentium® family of microprocessors, the Intel® Itanium® family of microprocessors, and/or the Intel XScale® family of processors. Of course, other processors from other families are also appropriate.

The processor 812 is in communication with a main memory including a volatile memory 818 and a non-volatile memory 820 via a bus 825. The volatile memory 818 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 820 may be implemented by flash memory and/or any other desired type of memory device. Access to the main memory 818, 820 is typically controlled by a memory controller (not shown) in a conventional manner.

The computer 800 also includes a conventional interface circuit 824. The interface circuit 824 may be implemented by any type of well known interface standard, such as an Ethernet interface, a universal serial bus (USB), and/or a third generation input/output (3GIO) interface.

One or more input devices 826 are connected to the interface circuit 824. The input device(s) 826 permit a user to enter data and commands into the processor 812. The input device(s) can be implemented by, for example, a keyboard, a mouse, a touchscreen, a track-pad, a trackball, isopoint and/or a voice recognition system.

One or more output devices 828 are also connected to the interface circuit 824. The output devices 828 can be implemented, for example, by display devices (e.g., a liquid crystal display, a cathode ray tube display (CRT), a printer and/or speakers). The interface circuit 824, thus, typically includes a graphics driver card.

The interface circuit 824 also includes a communication device such as a modem or network interface card to facilitate exchange of data with external computers via a network (e.g., an Ethernet connection, a digital subscriber line (DSL), a telephone line, coaxial cable, a cellular telephone system, etc.).

The computer 800 also includes one or more mass storage devices 830 for storing software and data. Examples of such mass storage devices 830 include floppy disk drives, hard drive disks, compact disk drives and digital versatile disk (DVD) drives.

At least some of the above described example methods and/or apparatus are implemented by one or more software and/or firmware programs running on a computer processor. However, dedicated hardware implementations including, but not limited to, application specific integrated circuits, programmable logic arrays and other hardware devices can likewise be constructed to implement some or all of the example methods and/or apparatus described herein, either in whole or in part. Furthermore, alternative software implementations including, but not limited to, distributed processing or component/object distributed processing, parallel processing, or virtual machine processing can also be constructed to implement the example methods and/or apparatus described herein.

It should also be noted that the example software and/or firmware implementations described herein are optionally stored on a tangible storage medium, such as: a magnetic medium (e.g., a magnetic disk or tape); a magneto-optical or optical medium such as an optical disk; or a solid state medium such as a memory card or other package that houses one or more read-only (non-volatile) memories, random access memories, or other re-writable (volatile) memories; or a signal containing computer instructions. A digital file attached to e-mail or other information archive or set of archives is considered a distribution medium equivalent to a tangible storage medium. Accordingly, the example software and/or firmware described herein can be stored on a tangible storage medium or distribution medium such as those described above or successor storage media.

Although this patent discloses example systems including software or firmware executed on hardware, it should be noted that such systems are merely illustrative and should not be considered as limiting. For example, it is contemplated that any or all of these hardware and software components could be embodied exclusively in hardware, exclusively in software, exclusively in firmware or in some combination of hardware, firmware and/or software. Accordingly, while the above specification described example systems, methods and articles of manufacture, persons of ordinary skill in the art will readily appreciate that the examples are not the only way to implement such systems, methods and articles of manufacture. Therefore, although certain example methods, apparatus and articles of manufacture have been described herein, the scope of coverage of this patent is not limited thereto. On the contrary, this patent covers all methods, apparatus and articles of manufacture fairly falling within the scope of the appended claims either literally or under the doctrine of equivalents.

What is claimed is:

1. A method for providing a voice communication inoperative condition notification, the method comprising:
    detecting that a voice over internet protocol device has been set to unconditional call forwarding for a threshold duration of time; and
    sending a session initiation protocol NOTIFY message identifying the unconditional call forwarding in response to (a) a session initiation protocol SUBSCRIBE message and (b) detecting the unconditional call forwarding,
    the session initiation protocol NOTIFY message to cause a notification of the unconditional call forwarding to be presented on a display of a media presentation device associated with the voice over internet protocol device.

2. A method as defined in claim 1, further including determining if the voice over internet protocol device is associated with an internet protocol television subscriber.

3. A method as defined in claim 2, further including retrieving an identifier for the internet protocol television subscriber associated with the voice over internet protocol device from a database.

4. A method as defined in claim 1, wherein detecting that the voice over internet protocol device has been set to unconditional call forwarding for the threshold duration of time includes comparing a notification repetition count associated with the voice over internet protocol device to a predefined repetition rate.

5. A method as defined in claim 1, further including adding at least one of a message associated with the unconditional call forwarding or an instruction associated with the unconditional call forwarding to the display.

6. A method as defined in claim 1, further comprising, in response to the session initiation protocol NOTIFY message, transmitting a notification to a television distribution system to cause the notification of the unconditional call forwarding to be presented on the display of the media presentation device associated with the voice over internet protocol device.

7. A method as defined in claim 6, further comprising accessing a database including records of television subscribers using information about the voice over internet protocol device included in the session initiation protocol NOTIFY message to determine the media presentation device to receive the notification.

8. A tangible article of manufacture storing machine readable instructions which, when executed, cause a machine to at least:
    detect that a voice over internet protocol device has been set to unconditional call forwarding for a threshold duration of time; and
    send a session initiation protocol NOTIFY message identifying the unconditional call forwarding in response to (a) a session initiation protocol SUBSCRIBE message and (b) detecting the unconditional call forwarding, the session initiation protocol NOTIFY message to cause a notification of the unconditional call forwarding to be presented on a display of a media presentation device associated with the voice over internet protocol device.

9. An article of manufacture as defined in claim 8, wherein the machine readable instructions further cause the machine to determine if the voice over internet protocol device is associated with an internet protocol television subscriber.

10. An article of manufacture as defined in claim 9, wherein the machine readable instructions further cause the machine to retrieve an identifier for the internet protocol television subscriber associated with the voice over internet protocol device from a database.

11. An article of manufacture as defined in claim 8, wherein the machine readable instructions, when executed, cause the machine to detect that the voice over internet protocol device has been set to unconditional call forwarding for the threshold duration of time by comparing a repetition rate associated with the voice over internet protocol device to a repetition rate threshold.

12. An article of manufacture as defined in claim 8, wherein the machine readable instructions further cause the machine to add at least one of a message associated with the unconditional call forwarding or an instruction associated with the unconditional call forwarding to the display.

13. An article of manufacture as defined in claim 8, wherein the machine readable instructions, when executed, cause the machine to, in response to the session initiation protocol NOTIFY message, transmit a notification to a television distribution system to cause the notification of the unconditional call forwarding to be presented on the display of the media presentation device associated with the voice over internet protocol device.

14. An article of manufacture as defined in claim 13, wherein the machine readable instructions, when executed, cause the machine to access a database including records of television subscribers using information about the voice over internet protocol device included in the session initiation protocol NOTIFY message to determine the media presentation device to receive the notification.

15. An apparatus comprising:
    a processor; and
    a memory to store machine readable instructions that, when executed by the processor, cause the processor to perform operations including:
        detecting that a voice over internet protocol device has been set to unconditional call forwarding for a threshold duration of time; and
        sending a session initiation protocol NOTIFY message identifying the unconditional call forwarding in response to (a) a session initiation protocol SUBSCRIBE message and (b) detecting the unconditional call forwarding, the session initiation protocol NOTIFY message to cause a notification of the unconditional call forwarding to be presented on a display of a media presentation device associated with the voice over internet protocol device.

16. An apparatus as defined in claim 15, wherein the machine readable instructions, when executed, cause the processor to determine if the voice over internet protocol device is associated with an internet protocol television subscriber.

17. An apparatus as defined in claim 16, wherein the machine readable instructions, when executed, cause the processor to retrieve an identifier for the internet protocol television subscriber associated with the voice over internet protocol device from a database.

18. An apparatus as defined in claim 15, wherein the machine readable instructions, when executed, cause the processor to detect that the voice over internet protocol device has been set to unconditional call forwarding for the threshold duration of time by comparing a notification repetition count associated with the voice over internet protocol device to a predefined repetition rate.

19. An apparatus as defined in claim 15, wherein the machine readable instructions, when executed, cause the processor to add at least one of a message associated with the unconditional call forwarding or an instruction associated with the unconditional call forwarding to the display.

20. An apparatus as defined in claim 15, wherein the machine readable instructions, when executed, cause the processor to, in response to the session initiation protocol NOTIFY message, transmit a notification to a television distribution system to cause the notification of the unconditional call forwarding to be presented on the display of the media presentation device associated with the voice over internet protocol device.

21. An apparatus as defined in claim 20, wherein the machine readable instructions, when executed, cause the processor to access a database including records of television subscribers using information about the voice over internet protocol device included in the session initiation protocol NOTIFY message to determine the media presentation device to receive the notification.

* * * * *